United States Patent [19]

Horrocks et al.

[11] 4,016,418

[45] Apr. 5, 1977

[54] METHOD OF RADIOACTIVITY ANALYSIS

[75] Inventors: Donald L. Horrocks, Placentia; Paul R. Klein, Laguna Niguel, both of Calif.

[73] Assignee: Beckman Instruments, Inc., Fullerton, Calif.

[22] Filed: Feb. 12, 1976

[21] Appl. No.: 657,523

[52] U.S. Cl. .............................. 250/252; 250/303; 250/369
[51] Int. Cl.² .......................................... G01D 8/00
[58] Field of Search ................... 250/252, 369, 303

[56] References Cited

UNITED STATES PATENTS 3,721,824   3/1973   Bristol ............................. 250/369

OTHER PUBLICATIONS

"Coincidence Method of Measuring Disintegration Rates of Radioactive Sources," by Barnothy et al., Rev. of Sci. Inst. vol. 22, No. 6, 6/51 pp. 415–423.
"The Standardization of Radioisotopes by Beta– Gamma Coincidence – – ," . ., by P. J. Campion, Int. Journal of Applied Radiation – – . .," vol. 4, pp. 232–248, 1959.

Primary Examiner—Harold A. Dixon
Attorney, Agent, or Firm—R. J. Steinmeyer; R. R. Meads

[57] ABSTRACT

A method for determining the source strength of a radioactive sample such as iodine-125 or cobalt-60, which emit pairs of quanta of radiation in coincidence, or near coincidence, and for determining the counting efficiency of a detection instrument analyzing such samples. A first counting channel is used to count events attributable to single quanta, a second counting channel is used to count events attributable to coincident pairs of quanta, and the sample source strength is computed from the results of measurement in these two counting channels. Then, the counting efficiency in a third channel designed for subsequent use in analyzing test samples may be determined from the counting of events in the third channel.

20 Claims, 4 Drawing Figures

METHOD OF RADIOACTIVITY ANALYSIS

BACKGROUND OF THE INVENTION

The present invention relates generally to the measurement of radioactivity, and, more particularly, to the measurement of radioactivity in certain radionuclides characterized by a decay pattern in which there is emission of two quanta of radiation, either gamma or x-rays, in coincidence or with essentially no delay between them.

Two important radionuclides producing coincident pairs of quanta are iodine-125 and cobalt-60, both of which are widely used in medicine. Iodine-125 has a relatively short half-life of approximately 60 days, which makes it well suited for use as a tracer in radioimmunoassay procedures for the measurement of levels of specific antigens or antibodies in the blood. Cobalt-60 is an isotope commonly used as a source in radiation therapy. In some radioimmunological studies, it is necessary to know the absolute amount of iodine-125 present in the sample being measured. Likewise, it is extremely important from a safety standpoint to be able to determine the absolute source strength of a cobalt-60 source used in radiation therapy.

One type of instrument commonly used to detect radiation of the aforedescribed type is a scintillation detector including a scintillation crystal and a photomultiplier tube. The crystal is adapted to receive the radionuclide while the phototube is designed to detect scintillations produced in the crystal by quanta emitted from the radionuclide. The scintillations detected by the phototube are converted into electrical pulses having pulse heights corresponding to the energy of the scintillations being detected.

When radionuclides produce pairs of quanta of radiation practically in time coincidence, some scintillations or events are detected which are the result of single quanta, the other quanta of the pair either being masked or not contributing to the event as detected. Such events are referred to as "single events". Other scintillations or events are detected which are the result of a coincidence of a pair of quanta. Such events are referred to as "coincident events" and give rise to pulses which are the sum of the energy responses produced by each quanta in the pair producing the event. Therefore, the pulse height or energy spectrum resulting from detection of such a radionuclide includes a pair of peaks resulting from the detection of single events and a single peak of relatively high energy resulting from the detection of coincident events. In the case of iodine-125, the energy of each quanta of each pair is substantially or exactly the same. Accordingly, for iodine-125 the energy spectrum includes one single event peak and one coincident event peak.

It has been pointed out by researches using multichannel analyzers in combination with scintillation detectors that the source strength of a sample of radionuclide producing coincident pairs of quanta can be determined mathematically from the total number of counts resulting from single events and the total number of counts resulting from coincident events. In this regard, a multichannel analyzer, as the term is generally understood, has a capability of segregating detected pulses by pulse-heights and providing a count of pulses for each of a relatively large number of fixed pulse-height increments or channels. In effect, a multichannel analyzer has the capability of producing a histogram equivalent to the energy spectrum resulting from the decay of a radionuclide being tested. Accordingly, with a multichannel analyzer, the researcher determines source strength $(S)$ by totaling the counts in all channels within the single event peaks $(N_S)$ and by totaling the counts in all channels within the coincident event peak $(N_C)$ and by applying the equation $$S = \frac{(N_S + 2N_C)^2}{4N_c}. \qquad (1)$$

In practice, multichannel analyzers are very complicated and expensive instruments. Also, they provide the researcher with much more information than needed in measuring the radioactivity of test samples. Therefore, multichannel analyzers are not used for routine experimental measurement of radioactivity. Rather, the common practice is to use a two step procedure. First, a sample of the type of radionuclide which will subsequently be analyzed in test samples is standardized by determining its absolute source strength in a multichannel analyzer. Then, the standardized sample is transferred to a scintillation counter which will be used in subsequent measurements of the source strengths of various test samples. In this regard, it is well known that scintillation counters are never totally effective in counting the absolute number of radioactive disintegrations of a sample since a significant portion of the radiation does not reach or is not measurable by the detector. Therefore, any given scintillation counter has a counting efficiency the value of which depends upon many factors including the detector and its geometry relative to the sample being measured as well as the electrical parameters of the counter. Consequently, before the scintillation counter can be employed in the subsequent measurements of radioactive test samples, the counting efficiency must be obtained using the standardized sample. This is accomplished by counting events in a measurement channel in the counter for a predetermined period of time. The counting efficiency then becomes a ratio of the number of counts per unit time divided by the source strength of the standardized sample. Having obtained the counting efficiency for the counter in the measurement channel, the scintillation counter then may be utilized to determine the source strength of other radioactive test samples simply by counting events in the measurement channel and dividing the count per unit time by the counting efficiency.

In the foregoing two step procedure, the relatively short half-life of iodine-125 poses serious problems. In particular, the source strength changes so rapidly that frequent calibration of the standardized source is required. With a multichannel analyzer such frequent calibration is expensive and time consuming.

To avoid the frequent recalibration of iodine-125 source, some have employed a standardized sample of iodine-125 having a strength known at a particular time and have attempted to compute the current source strength based upon the best known half-life value of iodine-125. One difficulty with this approach is that the half-life of iodine-125 is not known to a high degree of accuracy. In fact, the uncertainty of the calculated current source strength of the sample increases exponentially with increasing age of the sample.

Still another approach which has been employed in an attempt to avoid frequent recalibration of iodine- 125 source has been to use simulated or mock sources which have decay properties similar to iodine-125 but which have a longer half-life. One can obtain a mock source such as iodine-129 which has been calibrated against a known standard iodine-125 source. The mock source then can be used to approximate the counting efficiency of a scintillation counter for subsequent use in measuring test samples including iodine-125. Clearly, this approach is inherently prone to error since the mock source can never precisely simulate the decay properties of iodine-125 and can only be used to approximate the counting efficiency of the scintillation counter.

It should also be mentioned in passing that the trend in governmental regulations controlling the use of radioactive substances for medical purposes is to require more frequent and more accurate calibration of the radioactive sources and instruments for detecting radioactivity. It is expected that a typical requirement soon to be imposed will be that radioactive sources and instruments be accurately calibrated at least daily.

In view of the foregoing problems, it should be apparent that there is a significant need in the field of radiation detection for a convenient technique for accurately determining the source strength of radionuclides such as iodine-125 and cobalt-60, and for directly determining the counting efficiency of instruments used to measure radiation from radionuclides of this type. The present invention clearly fulfills this need.

SUMMARY OF THE INVENTION

The present invention is principally concerned with the measurement of the source strength of a radionuclide which emits two quanta of radiation in closely spaced time relationship, using the same instrument which is to be utilized for subsequent experimental measurements of the radiation. Basically, the method of the invention includes the steps of measuring in a first counting channel the energy pulses due to single quanta, measuring in a second counting channel the energy pulses due to coincident pairs of quanta and determining the strength of the source of radiation from the results of the two measuring steps. The instrument in which the method of the invention can be carried out may be a single-channel instrument, in which case the measurements in the first and second counting channels would be performed sequentially. Alternatively, the instrument could have two or more channels, in which case the measurements in the two counting channels could be performed simultaneously. However, a multichannel instrument of the usual type in which samples are calibrated, having a relatively large number of narrow channels with fixed pulse-height discriminator limits, cannot be used to determine the source strength of a sample in accordance with the method of the present invention.

In accordance with one aspect of the invention, upper and lower discriminator limits of the first and second channels are predetermined by measuring the radiation received in a relatively narrow counting channel, and selectively changing the discriminator limits of the relatively narrow counting channel to locate the proper boundaries for the first and second channels. More specifically, the pulse-height spectrum for iodine-125 includes a first peak due to the detection of single quanta and a second peak due to the detection of coincident pairs of quanta. Consequently, the boundary between the two channels in this instance is a valley or trough between the two peaks, and the method of the invention, as it relates to the detection of iodine-125 radiation, includes the steps of selectively changing the limits of the relatively narrow counting channel to determine the bottom or minimum point of the trough.

Once the boundaries or limits of the two counting channels have been determined, they need not be redetermined for each subsequent measurement, since the characteristics of the pulse-height spectrum will remain substantially constant, so long as the gain and other parameters of the instrument are held constant.

In accordance with another important aspect of the invention, a counting efficiency is determined on the same instrument as is used for the determination of the source strength of the radionuclide sample. The counting efficiency is arrived at by measuring radiation in a third counting channel which will be used in subsequent experimental measurements of radiation, and computing the counting efficiency of the instrument for the third channel, based on the absolute source strength determined from the measurements in the first and second channels. Again, the instrument used for this purpose could be a singel-channel instrument, in which case the measurements in the first, second and third channels would be taken sequentially. Alternatively, a three-channel instrument could be used, in which case only one test is required to obtain both the source strength of the sample and the counting efficiency of the instrument.

It should be apparent that the present invention eliminates or minimizes the problems associated with prior art techniques for the analysis of radioactivity from samples of such isotopes as iodine-125 and cobalt-60. In particular, it provides for the measurement of source strength and counting efficiency on the same instrument that is used in experimental measurements, thereby eliminating the need for an expensive multichannel analyzer, for mock sources, or calibrations dependent on a knowledge of the half-life of the radionuclide. Since the counting efficiency can be readily and conveniently obtained every time that the instrument is used, the instrument is essentially self-calibrating, and, by monitoring the magnitude of the counting efficiency, a reliable indication can be obtained of the long-term stability of the instrument. Moreover, the convenient determination of counting efficiency eliminates the problems associated with the correlation of readings taken on more than one instrument, and the similar problems arising from variations in counting efficiency due to changes in sample geometry or instrument configuration.

Other aspects and advantages of the invention will become apparent from the following more detailed description, taken in conjunction with the accompanying drawings.

DETAILED DESCRIPTION

Figure 1:
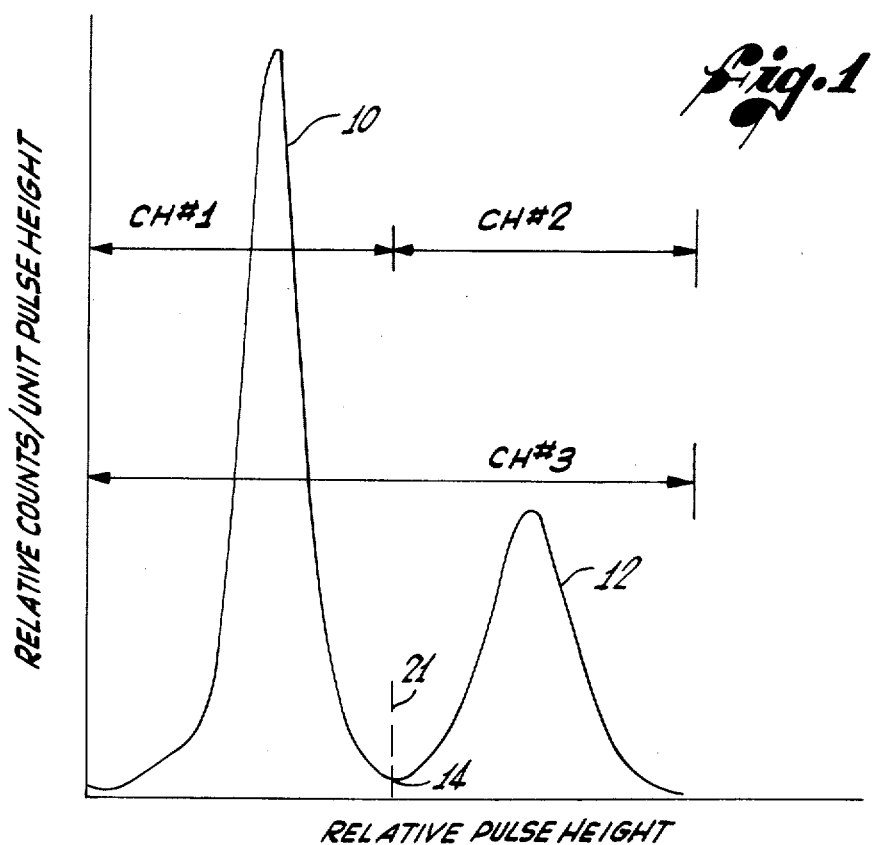
FIG. 1 is a typical pulse-height spectrum for iodine-125, showing the counting channels selected in accordance with the present invention.

As shown in the drawings for purposes of illustration, the present invention is principally concerned with a technique for measuring the source strength of a radionuclide having a decay pattern wherein pairs of quanta of radiation are emitted in coincidence or in closely spaced time relationship. Two important radionuclides of this type are iodine-125 and cobalt-60, and this description will be directed, by way of example only, to the method of the invention as it applies particularly to these radionuclides.

The decay pattern of iodine-125 is quite complex, but, in summary, some of the decays give rise to a single quantum of detectable radiation, either a 27.5 keV X-ray or a 35.5 keV gamma ray, and some of the decays give rise to two coincident quanta of radiation, either two X-rays or an X-ray and a gamma ray. In most instruments, it is not possible to distinguish between the two different energies of a single quanta, nor between the two different energies of coincident quanta. The pulse-height spectrum for iodine-125 is shown in FIG. 1, and includes a first peak, indicated by reference numeral 10, and a second peak 12 of a relatively higher pulse height, but a relatively lower number of counts, than the first. The first peak 10 is referred to as the "singles" peak, and results from the detection of single quanta, but those which are true single quanta and those resulting from coincident-quanta in which only one quantum has been detected. The second peak 12 results from the detection of coincident or nearly coincident quanta.

It will be appreciated that each quanta of different energy will have associated with it a different counting efficiency, or probability of detection. For example, if:

$N_{S_1}$ = the number of detected single-quanta of one type per unit time, $N_{S_2}$ = the number of detected single-quanta of the other type per unit time, $N_c$ = the number of detected coincident quanta per unit time, S = the source strength or number of transformations per unit time, $\epsilon_1$ = the counting efficiency with respect to quanta of the first type, and $\epsilon_2$ = the counting efficiency with respect to quanta of the second type, then the following relationships apply:

$$N_{S_1} = \epsilon_1 S - \epsilon_1 \epsilon_2 S \quad (2)$$

$$N_{S_2} = \epsilon_2 S - \epsilon_1 \epsilon_2 S \quad (3)$$

$$N_c = \epsilon_1 \epsilon_2 S \quad (4)$$

The total singles count is defined as:

$$N_S = N_{S_1} + N_{S_2} . \quad (5)$$

Since the energy of the two types of quanta is essentially the same, it may be assumed that $\epsilon_1 = \epsilon_2 = \epsilon$. Then if a ratio R is defined as:

$$R = \frac{N_c}{N_S} ,$$

the above equations can be solved for S to give:

$$S = \frac{N_c}{\epsilon^2} = N_c \left[ \frac{1 + 2R}{2R} \right]^2 \quad (6)$$

This mathematical expression for source strength has been known for some years in one form or another, and is not, per se, claimed to be part of the present invention. In the prior art techniques for the measurement of iodine-125 radiation, the values of $N_c$ and $N_S$ were obtained using a multichannel analyzer having a relatively large number of channels, so that the pulse-height spectrum shown in FIG. 1 could be plotted in its entirety as a histogram, and the numbers of counts resulting in the peaks 10 and 12 could be computed by integration or accumulation of a number of separate incremental counts.

In accordance with the present invention, the values of $N_S$ and $N_c$, indicative of the singles and coincidence counts respectively, are obtained directly in the same instrument to be used for routine experimental measurement. The singles count, $N_S$, is obtained in a first channel, designated channel No. 1, having pulse-height discriminator settings of zero pulse height at the minimum end, and a maximum pulse height determined by the minimum point of the trough in the pulse-height spectrum, indicated at 14 in FIG. 1. Similarly, the coincidence count, $N_c$, is measured directly in a second channel, designated channel No. 2, having a lower discriminator setting equal to the upper discriminator setting of channel No. 1, and having an upper discriminator setting selected to include the entire coincidence peak 12. The values of $N_S$ and $N_c$ are then utilized to compute the value of source strength using equation (6) above.

A third channel, designated channel No. 3, is the one that will be used for subsequent experimental measurement of radiation from iodine-125 samples. The third channel is shown in FIG. 1 to cover the entire pulse-height spectrum including both channels Nos. 1 and 2. However, channel No. 3 could instead be selected to employ any convenient "window" of the pulse-height spectrum, in accordance with particular test requirements. A total count of detected pulses is also accumulated for channel No. 3, and the counting efficiency for this channel can then be readily computed from this count and the computed source strength, using the simple expression:

$$\text{Counting efficiency } (\%) = \frac{\text{Number of counts per unit time}}{S} \times 100. \quad (7)$$

The instrument on which the measurements in channels No. 1, No. 2 and No. 3 are taken may be a single-channel instrument, in which case the discriminator settings of the single channel need to be varied sequentially in order to perform the three measurements. Alternatively, a three-channel instrument could be used, in which case all three readings could be taken simultaneously, and the values of source strength and counting efficiency in the third channel could be obtained directly from a single test on the radionuclide sample.

Although no detailed knowledge of the entire pulse-height spectrum shown in FIG. 1 is required to practice the method of the invention, the minimum point of the trough 14 must be known with some accuracy, in order to know where to set the discriminator settings of channels Nos. 1 and Nos. 2. However, once this has been determined, it need not be redetermined each time that a new measurement of source strength and counting efficiency is required. So long as the instrument gain remains the same, the relative pulse height at which the trough 14 occurs should remain substantially constant.

The position of the minimum point of the trough 14 can be determined by adjusting the discriminator settings of a counting channel until a relatively narrow counting channel is obtained, and utilizing the narrow counting channel to scan the area of the pulse-height spectrum in proximity to the trough. This series of steps can be performed manually on a conventional instrument, or the steps could be computer controlled to arrive at the minimum point 14 automatically. Once the minimum point of the trough 14 has been determined, it need not be redetermined if the gain of the instrument can be reset to the value that obtained during the trough determination. One way of doing this is to utilize a standard radionuclide having a quanta of known energy. When the trough is initially located, the relative pulse height corresponding to the peak produced by the quanta from the standard radionuclide is also noted. Subsequently, it is only necessary to adjust the gain until the standard radionuclide causes a response peak at the same noted relative pulse height. Then the instrument is properly calibrated, and the same channel Nos. 1 and 2 discriminator settings may be used as before.

Figure 2:
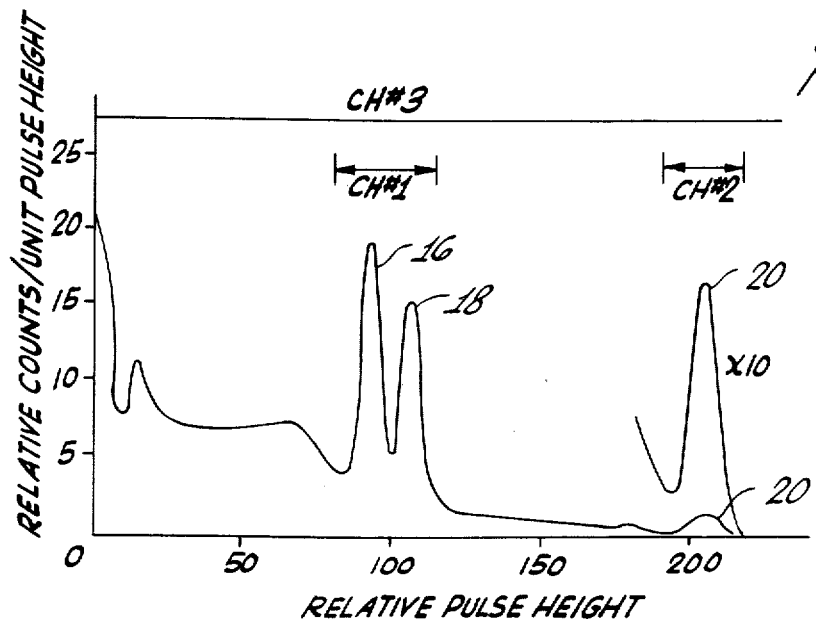
FIG. 2 is a typical pulse-height spectrum for cobalt-60 showing the counting channels selected in accordance with the present invention.

FIG. 2 shows a pulse-height spectrum for the detection of radiation from cobalt-60. This radionuclide produces two coincident gamma rays, one of 1.17 MeV and the other of 1.33 MeV. These are detected as two separate peaks, indicated at 16 and 18 in FIG. 2. A coincidence peak 20 is therefore equivalent to a 2.50 MeV gamma ray. In measurements of cobalt-60 radiation, the channel No. 1 discriminator settings are adjusted to cover both of the singles peaks 16 and 18, and the channel No. 2 discriminator settings are adjusted so that the coincidence peak 20 is detected. The third or experimental channel, channel No. 3, is selected, as shown in FIG. 2 to cover the entire pulse-height spectrum. Again, this selection of channel No. 3 is by way of example only, and the channel could be selected to cover any desired fraction of the total spectrum, as required by the conditions of a particular experiment. As with the iodine-125 measurements, the values of $N_S$ and $N_c$ are obtained from the channel No. 1 and the channel No. 2 readings, respectively, and are used to calculate the source strength S in accordance with equation (6).

The counting efficiency in channel No. 3 can then be determined from the number of counts recorded in that channel and the source strength. Also as with the iodine-125 example, measurements for the cobalt-60 radionuclide can be made on either a single-channel or a three-channel instrument.

Figure 3:
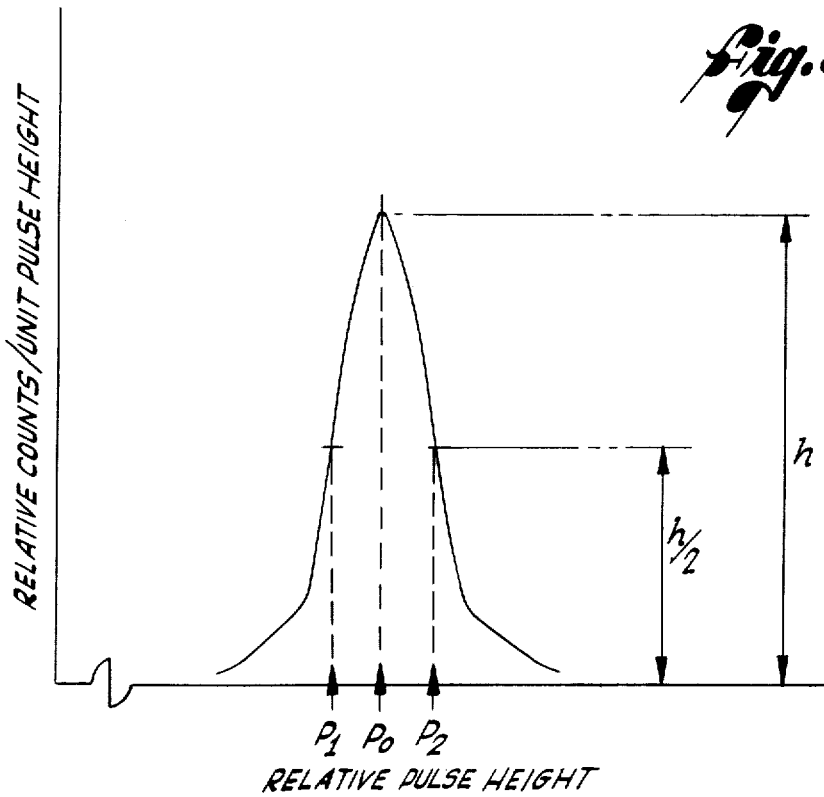
FIG. 3 shows a peak in a pulse-height spectrum, and illustrates a definition of instrument resolution.

The determination of the minimum trough point 14 for iodine-125, and the separation of peaks in general in pulse-height spectra, will depend largely on the resolving power of the instrument used. As illustrated in FIG. 3, the resolution of an instrument can be defined as:

$$\text{Resolution (\%)} = \frac{(P_2 - P_1)}{P_0} \times 100, \qquad (8)$$

where $P_1$ and $P_2$ are the relative pulse heights at points in the spectrum having half the maximum height of the peak, and $P_0$ is the pulse height corresponding to the maximum height of the peak.

The smaller the resolution, the smaller will be the spread of a given peak, and the less will be the overlap of adjacent peaks having close to the same energy levels. So long as the resolution is relatively small, the trough between two peaks can be determined without a substantial probability of error, and the peaks can be separated by truncation, i.e., by drawing an imaginary vertical line, as shown at 21 in FIG. 1, at the determined minimum point of the trough.

Figure 4:
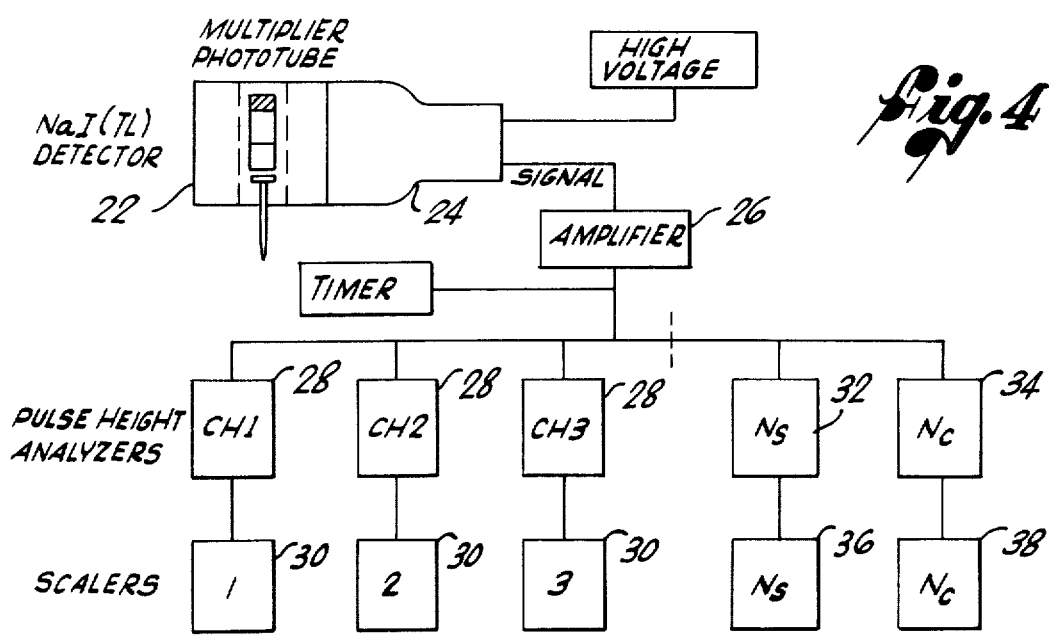
FIG. 4 is a simplified block diagram of a pulse-height analyzer having fixed-window channels for the automatic determination of source strength and counting efficiency.

FIG. 4 shows a simplified block diagram of an automatic pulse-height analyzer which includes, as is conventional, a sodium iodide thallium activated detector 22 coupled with a multiplier phototube 24, the output of which is passed through an amplifier 26 to three conventional pulse-height analyzers 28 having their respective outputs directed to three corresponding scalers 30. Also included are two additional pulse-height analyzers 32 and 34 with discriminator settings adjusted to provide fixed windows for measuring the singles count, $N_S$, and coincidence count, $N_c$, for a particular radionuclide such as iodine-125. Corresponding scalers 36 and 38, respectively, are also provided. With this arrangement, the pulse-height analyzers 28 of the conventional counting channels of the instrument can be used in the normal manner, and the additional pulse-height analyzers 32 and 34 will provide an automatic determination of source strength each time the instrument is used with the particular radionuclide for which the $N_S$ and $N_c$ channels were selected to monitor. From the computed source strength, a counting efficiency with respect to a desired counting channel could also be computed. Once the counting efficiency is determined, test samples containing either iodine-125 or cobalt-60 may be analyzed directly for source strength (S) simply by counting in the channel determining the counts per unit of time and dividing by the counting efficiency [see equation (7) above].

It will be appreciated from the foregoing that the present invention represents a significant advance in the field of radioactivity analysis. In particular, in the detection of radiation from radionuclides having decay patterns in which pairs of closely spaced quanta of radiation are emitted, the method of the invention allows the convenient determination of source strength and counting efficiency, both on the same instrument that is to be used for subsequent routine experimental measurements. This eliminates many of the problems associated with monitoring radiation from such isotopes as iodine-125 and cobalt-60 in accordance with techniques commonly used heretofore. In particular, it allows for direct measurement and calculation of source strength and counting efficiency using the test samples themselves as the standard radionuclide source. Also the present invention permits the measure of counting efficiency to function as a measure of the stability of the detection instrument. In that regard, once the counting efficiency for a given type of source is determined, it should remain constant irrespective of the age of the source.

It will also be appreciated that, although a particular form of the invention has been described with regard to the measurement of radiation from particular radionuclides, various changes and modifications may be made in the described form without departing from the spirit and scope of the invention. Accordingly, the invention is not to be limited except as by the appended claims.

We claim:

1. A method of determining the radioactive source strength of a sample of a radionuclide which emits two quanta of radiation in coincidence or near coincidence, said method comprising the steps of:
   measuring only in a first counting channel of a detection instrument the radiation due to single quanta;
   measuring only in a second counting channel of the detection instrument the radiation due to coincident pairs of quanta; and
   computing the source strength of the sample from the results of said measuring steps;
   whereby the source strength may be conveniently determined on an instrument also used for routine radiation measurements.

2. A method as set forth in claim 1, and further comprising the step of:
   determining upper and lower discriminator limits for said first and second channels, including the steps of measuring the radiation received in a relatively narrow counting channel, and selectively changing the limits of the relatively narrow counting channel to locate appropriate boundaries for said first and second channels.

3. A method as set forth in claim 2, wherein:
   the radionuclide sample has a decay pattern resulting in a pulse-height spectrum with adjacent peaks attributable to the detection of single quanta and coincident pairs of quanta, respectively; and
   said step of determining upper and lower discriminator limits includes scanning a region of the pulse-height spectrum between the two peaks, in order to locate a minimum point in the spectrum.

4. A method as set forth in claim 1, and further including the step of:
   setting upper and lower pulse-height discriminator levels for said first and second counting channels, said discriminator levels corresponding to predetermined energy levels defining energy limits for single quanta and coincident pairs of quanta.

5. A method as set forth in claim 4, wherein:
   the predetermined energy levels are determined by measuring the radiation received in a relatively narrow counting channel, and selectively changing the discriminator limits of the narrow counting channel to locate appropriate boundaries for said first and second channels; and
   said step of setting upper and lower discriminator settings includes setting the gain of the instrument to the same value obtaining during the determination of said predetermined energy levels.

6. A method as set forth in claim 1, wherein:
   the detection instrument has only one counting channel with adjustable pulse-height discriminator limits; and
   said measuring steps are performed sequentially and include prior adjustment of the pulse-height discrimination limits.

7. A method as set forth in claim 1, wherein:
   the instrument has at least two counting channels; and
   said measuring steps are performed simultaneously.

8. A method as set forth in claim 1, wherein:
   said steps of measuring in said first and second channels result in $N_S$ and $N_c$ counts per unit time, respectively; and
   said step of computing source strength is in accordance with the formula $$S = N_c \left[ \frac{1 + 2R}{2R} \right]^2,$$

where
   $S$ = source strength and $$R = \frac{N_c}{N_s}.$$

9. A method of determining the source strength of a radioactive sample and the counting efficiency of an instrument used in the measurement of radiation from a radionuclide which emits two quanta of radiation in coincidence or near coincidence, said method comprising the steps of:
   measuring only in a first counting channel of the instrument the radiation due to single quanta;
   measuring only in a second counting channel of the instrument the radiation due to coincident pairs of quanta;
   computing the source strength of the sample from the results of said measuring steps;
   measuring radiation in a third counting channel of the same instrument, the third counting channel being the one which is to be used in subsequent experimental measurements of radiation; and
   computing the counting efficiency of the instrument with respect to the third channel;
   whereby the source strength and counting efficiency may be conveniently determined on the same instrument to be used for routine radiation measurements.

10. A method as set forth in claim 9, wherein:
    said steps of measuring in said first, second and third channels result in $N_S$, $N_c$ and $N_W$ counts per unit time, respectively;
    said step of computing source strength is in accordance with the formula $$S = N_c \left[ \frac{1 + 2R}{2R} \right]^2,$$

where
    $S$ = source strength and $$R = \frac{N_c}{N_S};$$

and
    said step of computing counting efficiency is in accordance with the formula $$\text{Efficiency (\%)} = \frac{N_w}{S} \times 100.$$

11. A method as set forth in claim 9, wherein the counting efficiency is determined on a scheduled basis and is utilized to provide an indication of the stability of the instrument.

12. A method as set forth in claim 9, and further comprising the step of determining upper and lower discriminator limits for said first and second channels, including the steps of measuring the radiation received in a relatively narrow counting channel, and selectively changing the limits of the relatively narrow counting channel to locate appropriate boundaries for said first and second channels.

13. A method as set forth in claim 9, and further including the step of:
setting upper and lower pulse-height discriminator levels for said first and second counting channels, said discriminator levels corresponding to predetermined energy levels defining energy limits for single quanta and coincident pairs of quanta.

14. A method as set forth in claim 13, wherein:
the predetermined energy levels are determined by measuring the radiation received in a relatively narrow counting channel, and selectively changing the discriminator limits of the narrow counting channel to locate appropriate boundaries for said first and second channels; and
said step of setting upper and lower discriminator settings includes setting the gain of the instrument to the same value obtaining during the determination of said predetermined energy levels.

15. A method as set forth in claim 9, wherein:
the radionuclide sample has a decay pattern resulting in a pulse-height spectrum with adjacent peaks attributable to the detection of singla quanta and coincident pairs of quanta, respectively; and
said method further includes the step of determining a minimum point between the two peaks, in order to set appropriate boundaries for said first and second channels.

16. A method as set forth in claim 9, wherein:
the detection instrument has only one counting channel with adjustable pulse-height discrimination limits; and
said measuring steps are performed sequentially and include prior adjustment of the pulse-height discrimination limits.

17. A method as set forth in claim 9, wherein:
the instrument has at least two counting channels; and
said measuring steps are performed simultaneously.

18. A method of determining the source strength of a radioactive sample and the counting efficiency of an instrument used in the measurement of radiation from a radionuclide which emits two quanta of radiation in coincidence or near coincidence, said method comprising the steps of:
accumulating a first count of detected pulses covering a first range of energy levels and resulting from the detection of single quanta;
accumulating a second count of pulses covering a second energy range of and resulting from the detection of coincident or nearly coincident pairs of quanta;
computing the source strength of the sample from the first and second accumulated counts;
accumulating a third count of detected pulses covering an energy level range corresponding to that which will be used in subsequent experimental measurements of radiation; and
computing the counting efficiency of the instrument as used to measure radiation in the third range of energy levels, from the third accumulated count and the computed source strength;
whereby the source strength and counting efficiency may be conveniently determined on the same instrument that is used for routine radiation measurements.

19. A method as set forth in claim 18, and further comprising the step of determining upper and lower pulse-height or energy limits for the range in which the said first count is accumulated and for the range in which the said second count is accumulated, said determining step further including the steps of measuring the radiation received in a relatively narrow energy spectrum band, and selectively changing the limits of the relatively narrow band to locate appropriate boundaries for the energy level ranges of the first and second counts.

20. A method as set forth in claim 19, wherein:
the radionuclide is iodine-125; and
said step of determining upper and lower discriminator limits includes locating the lowest point in a trough between peaks resulting from singal quanta and coincident pairs of quanta respectively.

* * * * *